US008374938B1

(12) United States Patent
Coughlan et al.

(10) Patent No.: US 8,374,938 B1
(45) Date of Patent: Feb. 12, 2013

(54) SYSTEM AND METHOD FOR MANAGING HEDGING OF LONGEVITY RISK

(75) Inventors: Guy D. Coughlan, Kingsto Upon-Thames (GB); Christopher S. Watts, London (GB); Amit Sinha, New York, NY (US); Maximo X. Silberberg, Jersey City, NJ (US)

(73) Assignee: JPMorgan Chase Bank, N.A., New York, NY (US)

( * ) Notice: Subject to any disclaimer, the term of this patent is extended or adjusted under 35 U.S.C. 154(b) by 262 days.

(21) Appl. No.: 12/732,241

(22) Filed: Mar. 26, 2010
(Under 37 CFR 1.47)

Related U.S. Application Data

(60) Provisional application No. 61/163,530, filed on Mar. 26, 2009.

(51) Int. Cl.
*G06Q 40/00* (2012.01)
(52) U.S. Cl. .................... 705/36 R; 705/35; 705/37
(58) Field of Classification Search .................. 705/35, 705/36 R, 37
See application file for complete search history.

(56) References Cited

U.S. PATENT DOCUMENTS

| | | | | |
|---|---|---|---|---|
| 7,840,464 | B2 * | 11/2010 | Coughlan et al. | 705/35 |
| 7,840,468 | B2 * | 11/2010 | Coughlan et al. | 705/36 R |
| 2005/0234821 | A1 * | 10/2005 | Benham et al. | 705/40 |
| 2007/0033119 | A1 * | 2/2007 | Dubitsky et al. | 705/35 |
| 2007/0219883 | A1 * | 9/2007 | Bronsnick et al. | 705/35 |
| 2008/0010095 | A1 * | 1/2008 | Joyce | 705/4 |
| 2008/0065425 | A1 * | 3/2008 | Giuffre et al. | 705/4 |
| 2008/0109346 | A1 * | 5/2008 | Valentino et al. | 705/37 |
| 2008/0189221 | A1 * | 8/2008 | Coughlan et al. | 705/36 R |
| 2008/0189222 | A1 * | 8/2008 | Coughlan et al. | 705/36 R |
| 2008/0281742 | A1 * | 11/2008 | Lyons et al. | 705/35 |
| 2008/0288298 | A1 * | 11/2008 | Dattatreya et al. | 705/4 |
| 2009/0037258 | A1 * | 2/2009 | Lyons et al. | 705/10 |
| 2009/0099979 | A1 * | 4/2009 | Raghavan et al. | 705/36 R |
| 2010/0121783 | A1 * | 5/2010 | Lyons et al. | 705/36 R |
| 2010/0121784 | A1 * | 5/2010 | Lyons et al. | 705/36 R |
| 2010/0121785 | A1 * | 5/2010 | Lyons et al. | 705/36 R |
| 2010/0131425 | A1 * | 5/2010 | Stolerman et al. | 705/36 R |
| 2012/0158612 | A1 * | 6/2012 | Robertson | 705/36 R |

OTHER PUBLICATIONS

"The Case for Longevity Bonds," by David Blake, Tom Boardman, and Andrew Cairns. Center for Retirement Research at Boston College. Jun. 2010, No. 10-10.*
"Swiss R launches longevity risk bond," by Sarah Mortimer. Reuters. Dec. 2, 2010.*
"The Longevity Bond," by Mark Azzopardi, BNP Paribas. First International Conference on Longevity Risk and Capital Markets Solutions. Feb. 18, 2005.*

* cited by examiner

*Primary Examiner* — Jagdish Patel
*Assistant Examiner* — Sara C Hamilton
(74) *Attorney, Agent, or Firm* — Goodwin Procter LLP

(57) ABSTRACT

A computer implemented method and system are provided for implementing a longevity bond management system for managing hedging of longevity of beneficiaries. The method may include issuing, through a special purpose vehicle, using computer processing components, a longevity bond having returns following a longevity index defined for a reference population of a pre-selected cohort of beneficiaries. The method may additionally include receiving from investors a payment amount for investment in the longevity bond, investing the payment amount in a collateral pool held by a custodian, and receiving cash flows from the investment in the collateral pool. The method may further include entering into a swap to exchange the cash flows from the investment for an amount equal to the difference between an actual and best-estimate longevity index amount and calculating, using computer processing components, based on the longevity index, a periodic payment to the investors based on the longevity performance of the pre-selected cohort of beneficiaries, such that the periodic payment increases when longevity exceeds expectations and decreases when longevity falls short of expectations.

20 Claims, 15 Drawing Sheets

Structure

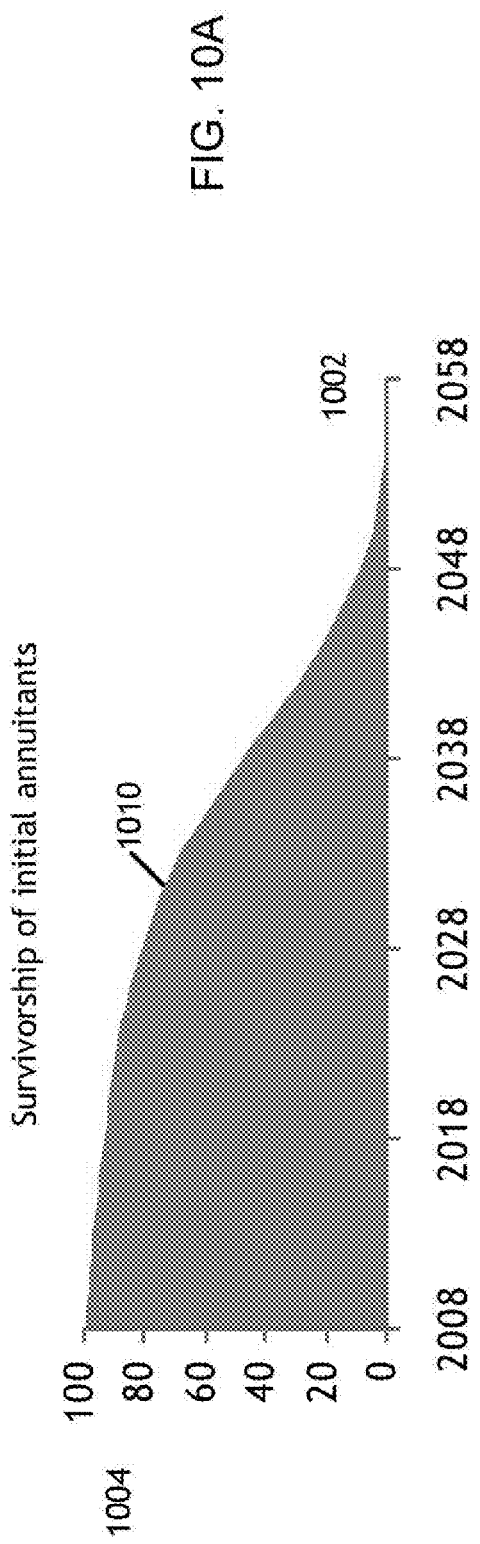
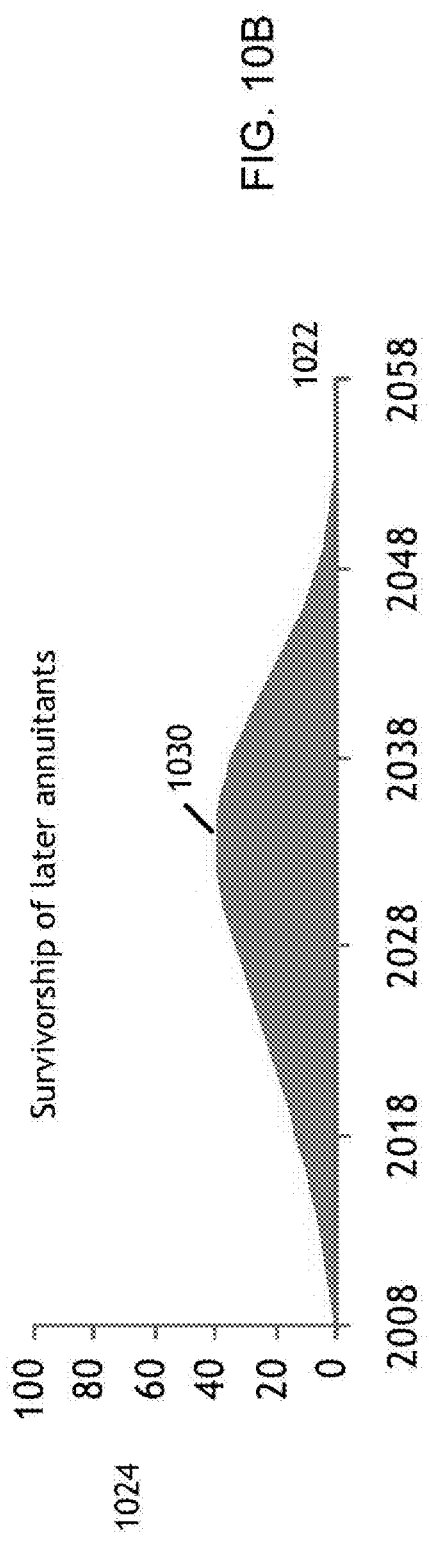

Initial weights for the Longevity Index

| 1210 | Cohort weights by age (%) b_y | Initial annuitants (%) w_y | Age difference (years) k(y) |
|---|---|---|---|
| 60 | 8.15% | 6.38% | 3 |
| 61 | 8.28% | 7.12% | 3 |
| 62 | 8.38% | 7.41% | 3 |
| 63 | 8.10% | 7.90% | 3 |
| 64 | 7.82% | 8.17% | 2 |
| 65 | 7.57% | 9.62% | 2 |
| 66 | 7.11% | 10.32% | 2 |
| 67 | 6.39% | 11.17% | 1 |
| 68 | 5.41% | 12.46% | 1 |
| 69 | 4.91% | 14.47% | 1 |
| 70 | 4.53% | 14.51% | 1 |
| 71 | 3.87% | 16.17% | 0 |
| 72 | 3.32% | 18.80% | 0 |
| 73 | 2.89% | 18.73% | -1 |
| 74 | 2.65% | 19.98% | -1 |
| 75 | 2.22% | 22.39% | -1 |
| 76 | 2.04% | 23.25% | -2 |
| 77 | 1.62% | 25.53% | -3 |
| 78 | 1.32% | 28.01% | -3 |
| 79 | 0.99% | 28.46% | -3 |
| 80 | 0.68% | 31.21% | -4 |
| 81 | 0.54% | 29.70% | -5 |
| 82 | 0.45% | 30.17% | -5 |
| 83 | 0.31% | 32.84% | -6 |
| 84 | 0.24% | 42.16% | -7 |
| 85 | 0.19% | 31.38% | -8 |
| | 100.00% | | |

SYSTEM AND METHOD FOR MANAGING HEDGING OF LONGEVITY RISK

TECHNICAL FIELD

Embodiments of the invention are related generally to systems and methods for managing longevity risk and in particular to systems and methods for offering an investment vehicle for hedging longevity risk and providing economic capital relief.

BACKGROUND OF THE INVENTION

Increasing human life spans have operated to create new challenges for the elderly and for existing infrastructures that support the elderly population. Members of the aging population are faced with the possibility of outliving their financial resources and therefore seek mechanisms that will guarantee financial independence. Accordingly, financial instruments have become available for providing long term financial security.

Corporate pensions and insurance company annuities, which are frequently utilized by the elderly contain significant interest rate, inflation, and longevity risks for the providers of such products including life insurers and pension plans. Under favorable market conditions in which high equity returns are realized, pension plan providers may not suffer from the impact of longevity improvements. However, as market conditions deteriorate and poor equity returns prevail, pension plan providers are impacted by the longevity improvements that have occurred over time. Furthermore, life insurers providing annuities face risks due to unanticipated changes in mortality rates.

To combat the risks mentioned above, pension plan providers and life insurers can attempt to transfer or hedge longevity risk. Longevity bonds are among the financial instruments that have developed and provide a form of insurance for betting against outliving savings through mortality rates. Longevity bonds pay a coupon that is proportional to the number of survivors in a selected birth cohort. If the cohort is defined, for example, as the number of individuals turning age sixty-five in the year that the bond is issued, the coupon the following year would be proportional to the number in the cohort that survive to the current year. Since this payoff approximately matches the liability of annuity providers, longevity bonds can theoretically be used to create an effective hedge against longevity risk.

However, a number of issues arise with the trading of mortality linked securities. Such issues may be related to the liquidity, basis risk, and credit risk. In order to make the securities attractive to hedgers, liquidity and low basis risk are desirable. In order to enhance liquidity, the design of the security should be transparent such that risks and potential returns are predictable. Furthermore, the reference population should be based on data from a reliable public source. Ultimately, in order to create a liquid market in mortality linked securities, the designed securities must be attractive for both buyers and sellers.

Thus, when providing payments linked to a survivorship index, it is important to implement an accurate predictive model. As stated above, pension funds and annuity providers face growing risks due to the increasing life spans as they may have guaranteed fixed or variable payments for a life span that has become unexpectedly lengthy. Thus, the longevity risk created by increasing life spans in conjunction with interest rate risk has caused problems for the annuity market. As annuity markets continue to grow, the risks and consequences of underestimating mortality improvements also continue to grow. Accordingly, a solution is needed for enhancing the predictive accuracy of the longevity bond model in order to further reduce risks.

Furthermore, in some instances, for example when a bond is issued by a government or government sponsored entity, the yield on the bond is too low to attract investors. Thus, investors have been reluctant to accept currently existing structures for issuing longevity bonds. The combination of the low yield and an imperfect demographic structure failing to adequately define a cohort for predictive accuracy have been deficiencies of previously attempted longevity bond systems. Thus, a solution is needed for providing a structure for issuing a longevity bond that will operate based on a demographically sound index and generate a sufficiently high yield for attracting investors.

BRIEF DESCRIPTION OF THE DRAWINGS

The present invention is described in detail below with reference to the attached drawings figures, wherein:

FIGS. 10A and 10B are charts illustrating survivorship of annuitants in accordance with an embodiment of the invention;

FIG. 12 is a chart illustrating longevity index weights in accordance with an embodiment of the invention;

SUMMARY OF PREFERRED EMBODIMENTS

Figure 1:
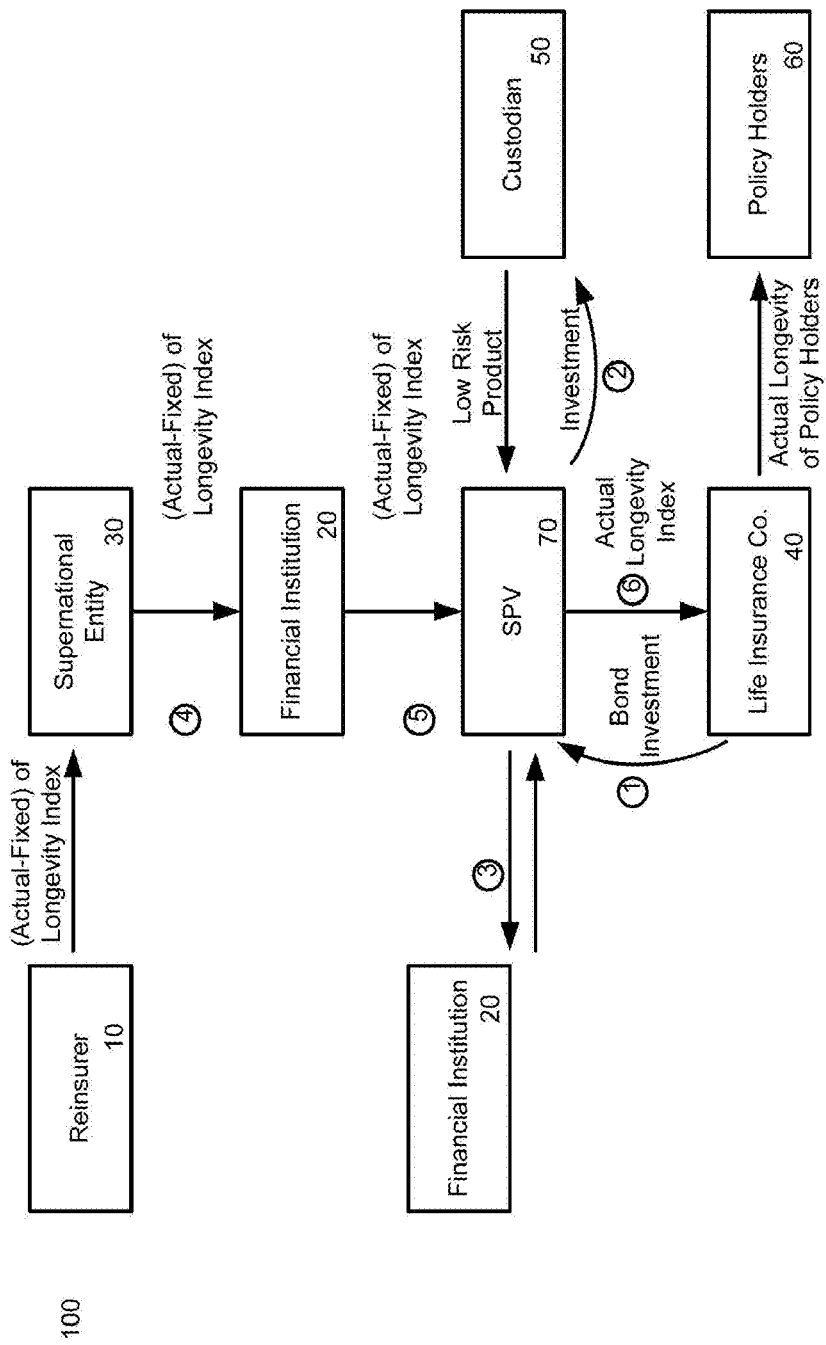
FIG. 1 is a work flow diagram illustrating work flow between system participants in accordance with a first embodiment of the invention.

In one aspect of the invention, a computer implemented method for is provided implementing a longevity bond management system for managing hedging of longevity of beneficiaries. The method includes issuing, through a special purpose vehicle, using computer processing components, a longevity bond having returns following a longevity index defined for a reference population of a pre-selected cohort of beneficiaries. The method additionally includes receiving from investors a payment amount for investment in the longevity bond, investing the payment amount in a collateral pool held by a custodian, and receiving cash flows from the investment in the collateral pool. The method further includes entering into a swap to exchange the cash flows from the investment for an amount equal to the difference between an actual and best-estimate longevity index amount and calculating, using computer processing components, based on the longevity index, a periodic payment to the investors based on the longevity performance of the pre-selected cohort of beneficiaries, such that the periodic payment increases when longevity exceeds expectations and decreases when longevity falls short of expectations. The method further includes forwarding the calculated period payment to the investors.

In a further aspect of the invention, a computer-implemented longevity bond management system is provided for managing hedging of longevity of beneficiaries. The longevity bond management system comprises index calculation components for calculating a longevity index defined for a reference population of a pre-selected cohort of beneficiaries and issuance components for issuing through a special purpose vehicle, using computer processing components, a longevity bond having returns following the calculated longevity index defined for a reference population including a pre-selected cohort of beneficiaries. The system additionally includes investor interfacing components for receiving from investors a payment amount for investment in the bond and forwarding a calculated periodic payment to the investors and custodian interfacing components for investing the payment amount in a collateral pool held by a custodian and receiving cash flows from the investment in the collateral pool. A swap execution engine may be provided for entering into a swap to exchange the cash flows from the investment for an amount equal to the difference between an actual and best-estimate longevity index amount. Additionally, a payment calculation engine may be provided to calculate, using computer processing components, based on the longevity index, a periodic payment to the investors based on the longevity performance of the pre-selected cohort of beneficiaries, such that the periodic payment increases when longevity exceeds expectations and decreases when longevity falls short of expectations.

In yet a further aspect of the invention, a computer implemented method is provided for implementing a longevity bond management system for managing hedging of longevity of beneficiaries. The method comprises defining a longevity index for a cohort for time t years after inception as follows:

$$S_t^{observed} = \sum_{y=60}^{91-max(t,6)} b_y \cdot I_{t,y}^{observed}$$

where $I_{t,y}^{observed}$ is the cohort specific survivorship index, given by $I_{t,y}^{observed} = {}_t p_y^{f,observed} \cdot [1-(1-w_y^{initial}) \cdot {}_t p_{y+k(y)}^{m,observed}]$ where y labels the cohort and represents age at the start of the index, $b_y$ is an initial weight of all female beneficiaries in the cohort as a proportion of all female beneficiaries aged sixty to eighty five, calculated by annual annuity amount; ${}_t p_y^{f,observed}$ is an observed survival rate from time 0 until time t for the age y cohort of female beneficiaries; $w_y^{initial}$ is an initial weight of widows among all female beneficiaries in cohort y calculated by annual annuity amount, k(y) is the average age difference in years between male annuitants and female beneficiaries in cohort y, weighted by income amount, and ${}_t p_{y+k(y)}^{m,observed}$ is the observed survival rate from time 0 to time t for the y+k(y) cohort of male annuitants. The method additionally includes issuing, through a special purpose vehicle, using computer processing components, a longevity bond having returns following the longevity index defined for a reference population including the cohort. The method further includes receiving from investors a payment amount for investment in the longevity bond, investing the payment amount in a collateral pool held by a custodian, and receiving cash flows from the investment in the collateral pool. Additionally, the method includes entering into a swap to exchange the cash flows from the investment for an amount equal to the difference between an actual and best-estimate longevity index amount. The method also includes calculating, using computer processing components, based on the longevity index, a periodic payment to the investors based on the longevity performance of the pre-selected cohort of beneficiaries, such that the periodic payment increases when longevity exceeds expectations and decreases when longevity falls short of expectations and forwarding the calculated period payment to the investors.

DETAILED DESCRIPTION OF PREFERRED EMBODIMENTS

Embodiments of the present invention are directed to a system for issuing and managing longevity bonds and hedging longevity risk The system and method rely on a special purpose vehicle (SPV) for issuing the longevity bonds. The SPV may be a limited company or partnership created to fulfill the objectives of the longevity bond management system and is preferably an offshore bankruptcy-remote company. The SPV issues the longevity bonds with the full support of a national insurance rate in order to provide an attractive investment for insurance companies. The SPV provides a vehicle for blending in credit risk in a customized way. Without an SPV, the system is linked to the credit quality of an existing issuer. Through integration of the SPV, customization of credit exposure accompanying longevity is enabled.

Moreover, embodiments of the invention define a target population whose longevity risk is being hedged and a corresponding longevity index. The target population is defined broadly enough so that sufficient data can be collected, but specifically enough in order to enhance predictability and reduce risk.

As will be further described herein, an annuity is a policy that pays a fixed amount periodically for life in return for an initial premium. An annuitant refers to a person receiving an annuity or pension payment. With particular reference to the embodiments described herein, a male annuitant or affiliado may be the policy holder whose spouse will receive a pension payment (annuity) after he dies. The female spouse, also referenced as a female beneficiary, or beneficiaria will start receiving a pension payment when her husband has died as long as she is still alive.

FIG. 1 is a block diagram illustrating work flow diagram providing an operating structure for a system in accordance with a first embodiment of the invention. As illustrated, participants may include a re-insurer 10, a financial institution 20, a super-national entity 30, an insurance company 40, a custodian 50, policy holders 60, and an SPV 70.

As provided by reference numeral 1, the insurance company 40 purchases a longevity bond from the SPV 70. In embodiments of the invention, the insurer 40 is a Chilean life insurance company that purchases a twenty five year Unidad de Fomento (UF) denominated longevity Bond issued by the SPV 70. The UF is the consumer price index (CPI) published daily by the national statistics institute of Chile. Each year, the insurer 40 receives an initial annuity amount multiplied by an initial forecast of the longevity index (i.e. the expected or best estimate), added to the initial annuity amount and multiplied by the difference between actual value of the longevity index at the date of the payout minus initial forecast of the longevity index for that date. In embodiments of the invention, a longevity bond management system operated by, integral with, or accessed by the SPV 70 or financial institution 20 is provided in order to determine the amount of the aforementioned payments.

In step 2 of FIG. 1, the SPV 70 invests in a portfolio of products from the custodian 50 holding the products in a collateral account. The SPV 70 receives coupon and principal from the investment. The nature of the portfolio of products may for example be a low risk debt type product, or alternatively may be bonds of a higher strength with some element of credit risk to help reduce cost of the longevity hedge. In embodiments of the invention, the collateral is invested in BTUs/BCUs, which are bonds in UF issued by the Chilean government, and therefore subject to credit risk of the Chilean government.

In step 3, the SPV 70 enters into a swap with the financial institution 20 to exchange the cash flows from the investment in Step 2 and receive a "best estimate" annuity cash flow. The annual payments correspond to the "best estimate" expectation of the longevity index in each year at inception. The financial institution 20 may reconstitute the actual bond cash flows into the survivorship profile of cash flows.

In step 4 of FIG. 1, the financial institution 20 fronts the SPV 70 for entering into a longevity swap with the super-national entity 30/re-insurer 10 to receive the difference between the actual and best-estimate longevity index level in each year. The super-national entity 30 provides credit enhancement to the re-insurer 10 and the re-insurer 10 is provided to underwrite longevity risk. In embodiments of the invention, the super-national entity may, for example, include the world bank.

The financial institution 20 provides a transformation that enables the super-national entity 30 to directly transact with the SPV 70, as typically super-national entities would encounter difficulties attempting to directly interface with the SPV 70.

Thus, in Step 5, the swap is completed after the financial institution 20 has acted as an intermediary between the super-national entity 30 and the SPV 70. Thus the SPV 70 receives the difference between the actual and best-estimate longevity index. Credit risk to swap counterparties may be mitigated via collateral agreements.

Finally, in step 6, the insurance company 40 receives the annual payments linked to the actual longevity index and is able to make payments to policy holders 60.

In summary, the use of the SPV 70 for issuance of longevity bonds enables a blending of credit risk with the longevity. Thus, the result is somewhat analogous to the behavior an insurer taking on an annuity portfolio, such that it takes on longevity risk of annuity and invests in corporate bonds with credit risk. In the present system, these risks are blended into the issuance of the longevity bond product.

In an embodiment of the invention, the longevity bond created is a longevity bond for Chilean Insurers. In the displayed embodiment, the longevity bond is a UF-denominated amortizing bond with a maturity of twenty five years. The bond is sponsored by the super-national entity and structured by the financial institution. The reinsurer performs longevity risk underwriting. Bond proceeds are invested in a portfolio of government BTUs. This investment provides cash flows that match longevity risk of the liability, with the security of Chilean government risk. The structure described above provides a higher yield than BTUs, thus offsetting the cost of longevity hedge.

Figure 2:
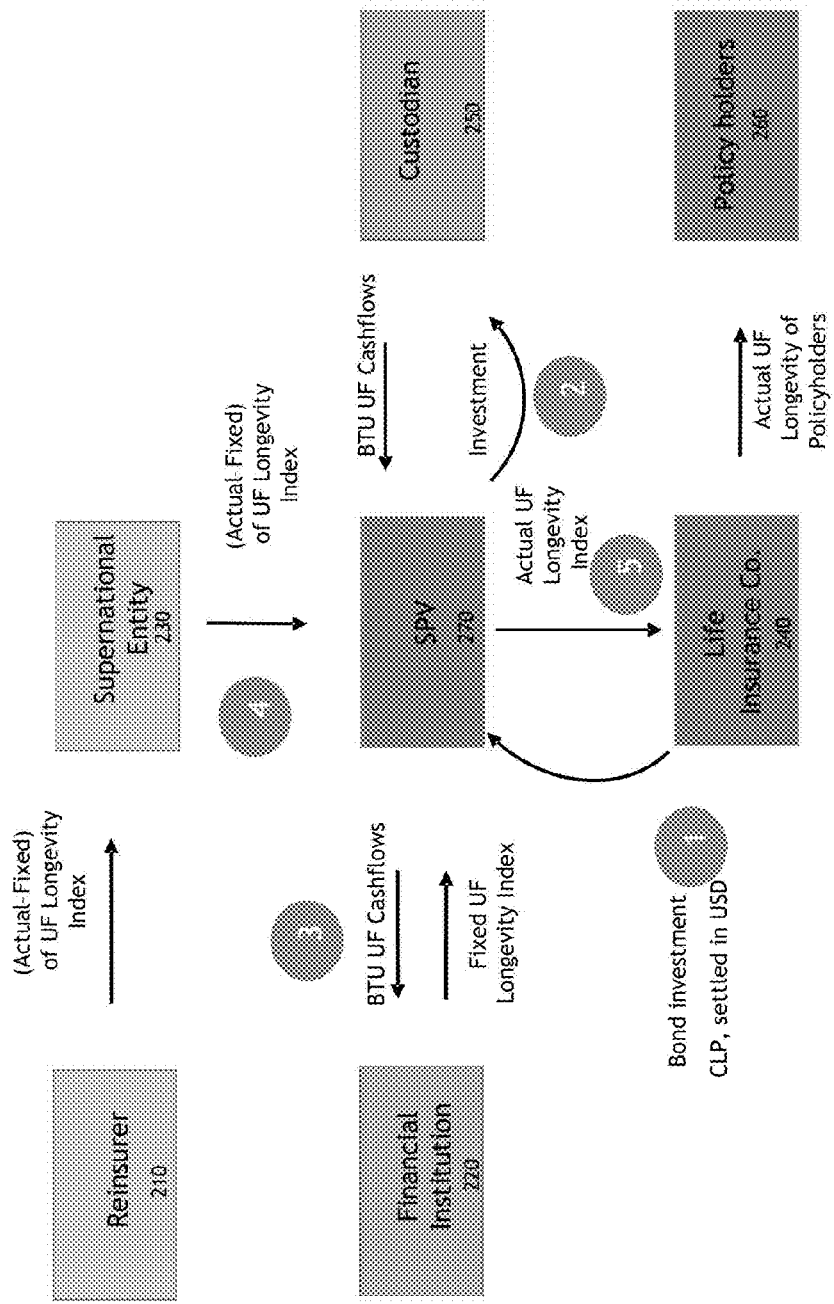
FIG. 2 is a work flow diagram illustrating work flow between system participants in accordance with a second embodiment of the invention.

FIG. 2 illustrates a work flow diagram in accordance with an alternative embodiment of the invention. In FIG. 2, a reinsurer 210, a financial institution 220, a super-national entity 230, an insurer 240, a custodian 250, policy holders 260, and SPV 270 participate in the process.

As provided by reference numeral 1, the insurance company 240 purchases a longevity bond from the SPV 270. As set forth above, periodically the insurer 240 receives an initial annuity amount multiplied by an initial forecast of the longevity index (i.e. the expected or best estimate), added to the initial annuity amount and multiplied by the difference between actual value of the longevity index at the date of the payout minus initial forecast of the longevity index for that date. In embodiments of the invention, a longevity bond management system operated by, integral with, or accessed by the SPV 270 or financial institution 220 is provided in order to determine the amount of the aforementioned payments.

In step 2 of FIG. 2, the SPV 270 invests in a portfolio of products from the custodian 250 holding the products in a collateral account. The SPV 270 receives coupon and principal from the investment. In step 3, the SPV 270 enters into a swap with the financial institution 220 to exchange the cash flows from the investment in Step 2 and receive a "best estimate" annuity cash flow. The annual payments correspond to the "best estimate" expectation of the longevity index in each year at inception. The financial institution 220 may reconstitute the actual bond cash flows into the survivorship profile of cash flows.

In step 4 of FIG. 2, the SPV 270 enters into a longevity swap with the super-national entity 230 to receive the difference between the actual and best best-estimate longevity index level in each year. The super-national entity 230 provides credit enhancement to the re-insurer 210 and the re-insurer 210 is provided to underwrite longevity risk. Thus, in Step 5, the insurance company 240 receives the annual payments linked to the actual longevity index and is able to make payments to policy holders 260.

Figure 3:
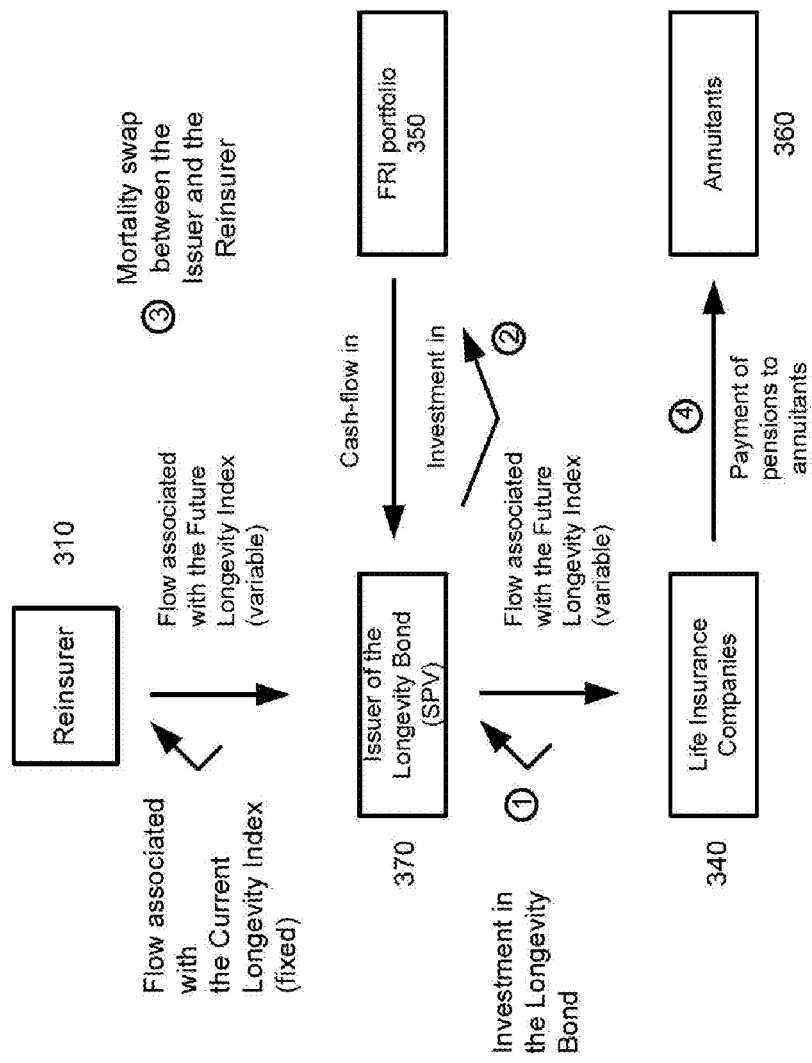
FIG. 3 is flow diagram illustrating work flow between system participants in accordance with a third embodiment of the invention.

FIG. 3 illustrates a work flow diagram in accordance with an alternative generalized embodiment of the invention. In FIG. 3, a reinsurer 310, an insurer 340, a custodian 350, annuitants or policy holders 360, and an SPV 370 participate in the process.

As provided by reference numeral 1, the insurance company 340 purchases a longevity bond from the SPV 370. Periodically, for example, each year, the insurer 340 receives an initial annuity amount multiplied by an initial forecast of the longevity Index, added to the initial annuity amount and multiplied by the difference between actual value of the longevity index at the date of the payout minus initial forecast of the longevity index for that date. In embodiments of the invention, a longevity bond management system operated by, integral with, or accessed by the SPV 370 is provided in order to determine the amount of the aforementioned payments.

In step 2 of FIG. 3, the SPV 370 invests in a portfolio of products from the custodian 350 holding the products in a collateral account. The SPV 370 receives coupon and principal from the investment. In step 3, the SPV 370 enters into a swap with the reinsurer 310 to exchange the cash flows from the investment in Step 2 and receive a "best estimate" annuity cash flow. The annual payments correspond to the "best estimate" expectation of the longevity index in each year at inception. In step 4 of FIG. 3, the insurance company 340 receives the annual payments linked to the actual longevity index and is able to make payments to policy holders 360.

Figure 4A:
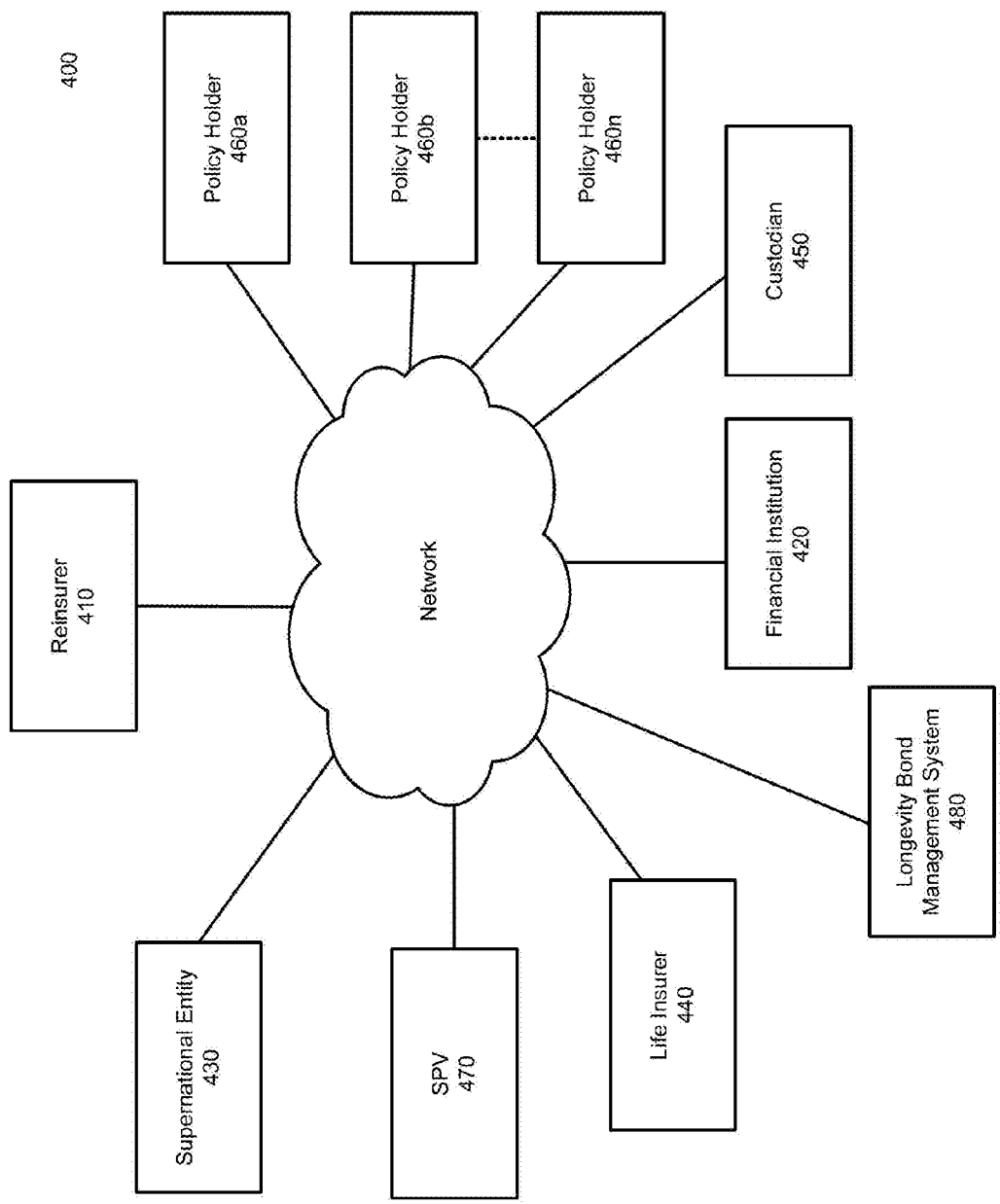
FIG. 4A is a block diagram illustrating an operating environment for implementing the method and system of the invention.

While FIGS. 1-3 show the work flow between participating parties, FIG. 4A is provided to illustrate an operating environment for execution of the work flow illustrated in FIG. 1. In FIG. 4, the parties that may be involved in the process, including a reinsurer 410, financial institution 420, a super-national entity 430, a life insurer 440, a custodian 450, policy holders 460a, 460b . . . 460n, an SPV 470, and a longevity bond management system 480 may be connected over a network 490. The network 490 may be, for example the Internet, and all of the aforementioned participants are embodied by computing systems capable of connecting over the network 490.

Various networks 490 may be implemented in accordance with embodiments of the invention, including a wired or wireless local area network (LAN) and a wide area network (WAN), wireless personal area network (PAN) and other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism. Computers may be connected over the Internet, an Intranet, Extranet, Ethernet, or any other system that provides communications. Some suitable communications protocols may include TCP/IP, UDP, or OSI for example. For wireless communications, communications protocols may include Bluetooth, Zigbee, IrDa or other suitable protocol. Furthermore, components of the system may communicate through a combination of wired or wireless paths.

Furthermore, as illustrated in FIG. 4A, the longevity bond management system 480 is connected to the parties over the network. The longevity bond management system 480 includes a computing system having a processor executing software modules for managing the work flow illustrated in FIGS. 1-3. The longevity bond management system 480 is responsible for determination of payment amounts, indices, and other factors required to implement the work flow as will be described herein The longevity bond management system 480 may be a discrete system as shown in FIG. 4. In alternative embodiments, the longevity bond management system 480 may be distributed so as to be located components in the systems of participants, for example with the SPV system 470 and with the financial institution system 420. The software modules implemented by the processor of the longevity bond management system 480 include instructions for executing all of the functions described herein below.

Figure 4B:
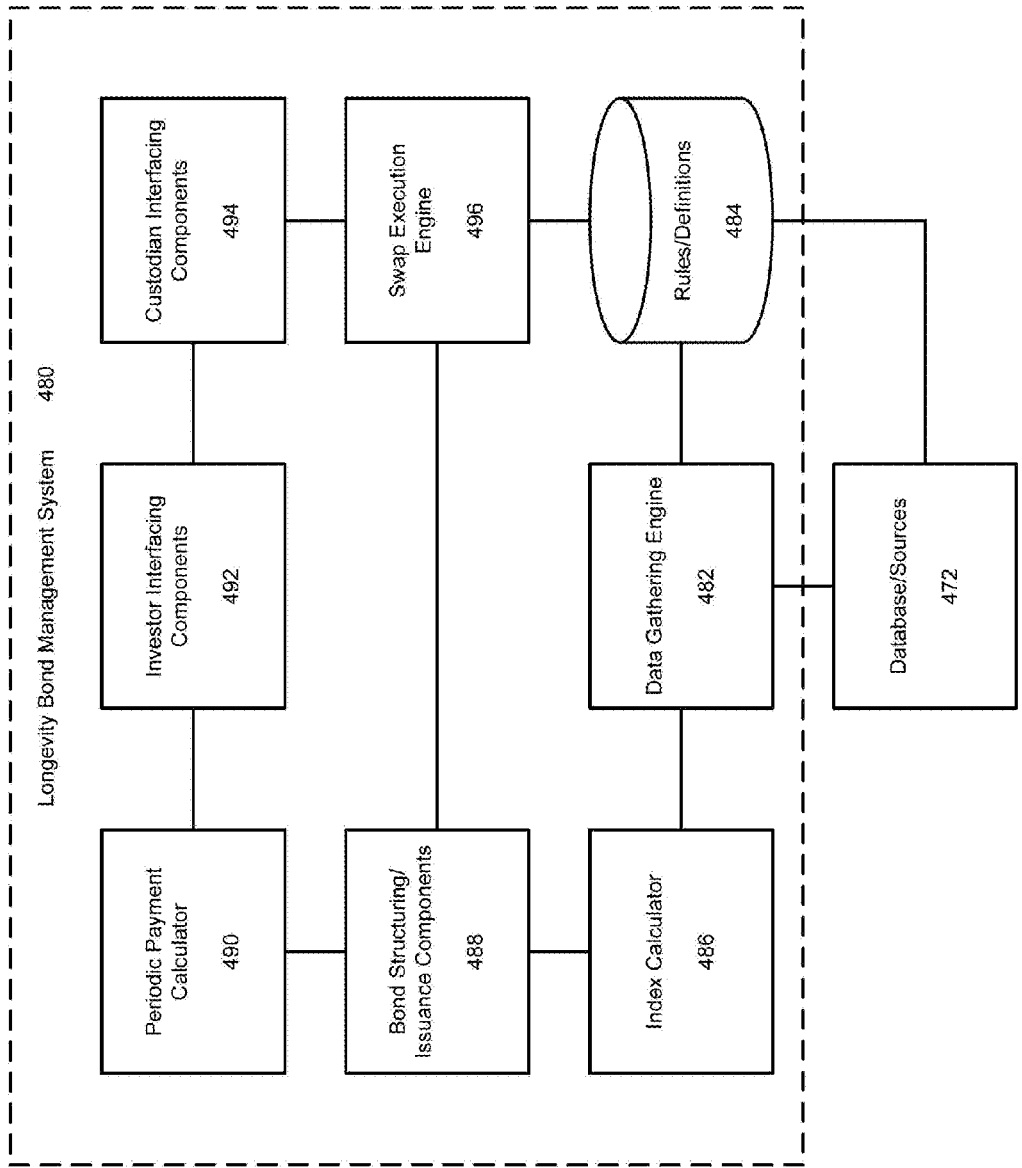
FIG. 4B is a block diagram illustrating a longevity bond management system in accordance with an embodiment of the invention.

FIG. 4B is a block diagram illustrating exemplary components of the longevity bond management system 480 in accordance with an embodiment of the invention. The longevity bond management system may include integral or discrete components or modules for performing all of the functions described herein. In FIG. 4B, the longevity bond management system 480 is illustrated as including a data gathering engine 482, rules and definitions 484, and index calculator 486, bond structuring/issuance components 488, periodic payment calculator 490, investor interfacing components 492, custodian interfacing components 494, and swap execution engine 496. All of the components may be interconnected in any chosen configuration. Furthermore, each component may comprise a combination of software and a distinct computing machines or alternatively all of the components may include software components running on a single or multiple computing machines. As illustrating, the data gathering engine 482 may gather data from publicly available databases and other sources 472 in order to formulate the index and make periodic updates. Based on the data collected as well as rules and definitions stored in the database 484, the index calculator may calculate the index at various points in time. The bond structuring/issuance components 488 may structure and issue the bond relative to the calculated index. The periodic payment calculator 490 may calculate payments to the investors as further explained herein based on both the initially calculated index and the index calculated as of a particular payout date. Investor interfacing components 492 and custodian interfacing components 494 serve to facilitate the functions described herein with respect to the investors and custodian. Additional interfaces may be provided for communication with other entities such as the super-national entity, the re-insurer, the financial institution, and the SPV. The swap execution engine 496 facilitates the swap involving the SPV and other parties such as the financial institution, super-national entity, and re-insurer.

Figure 5:
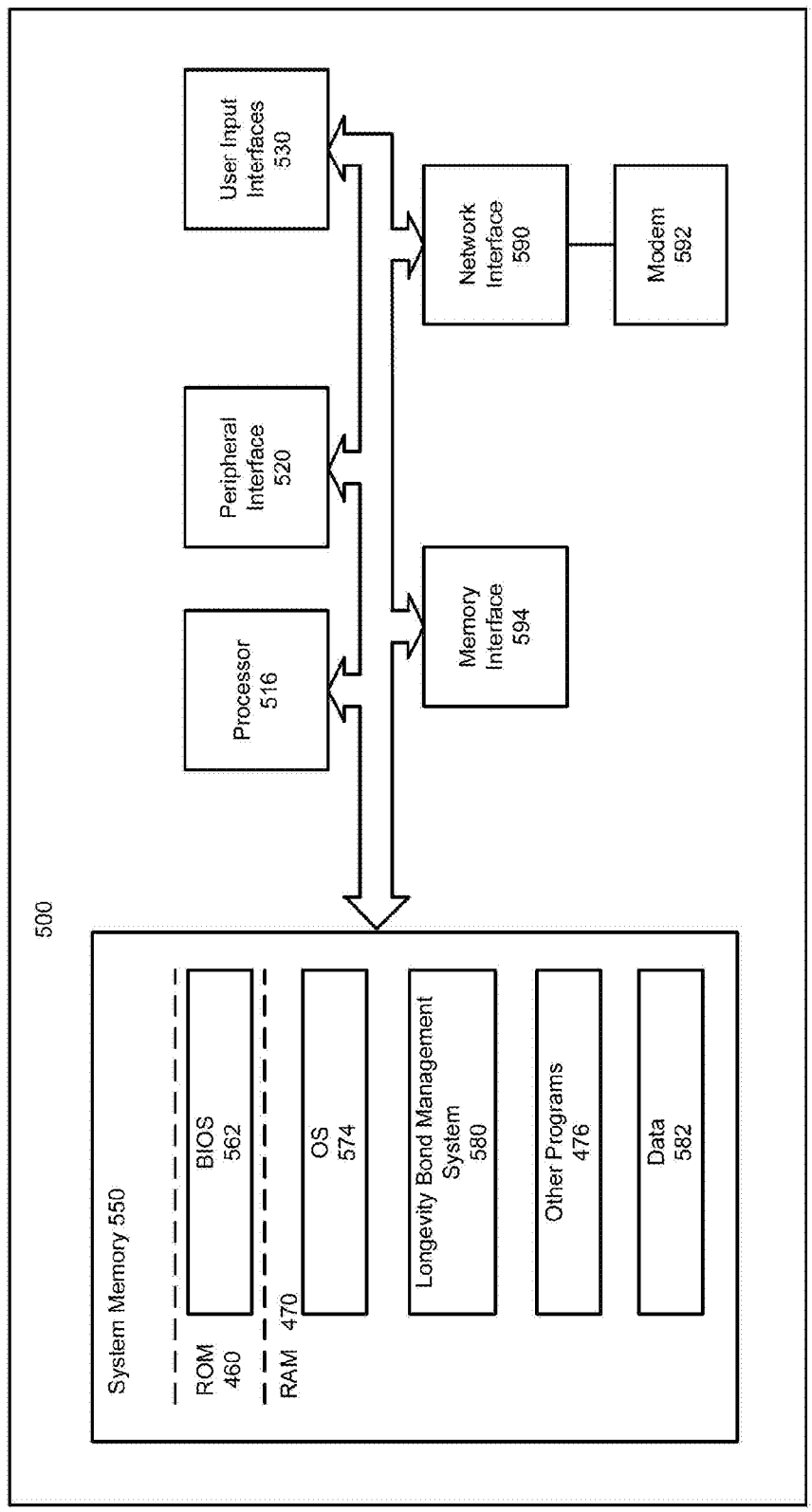
FIG. 5 is a block diagram illustrating a computing environment for implementing the method and system of the invention.

All of the components shown in FIGS. 1-4 above may be, include, or be implemented by a computer or multiple computers. FIG. 5 illustrates a possible computing environment for implementing the longevity bond management system 480. The components may be described in the general context of computer-executable instructions, such as program modules, being executed by a computer. Generally, program modules include routines, programs, objects, components, data structures, etc. that perform particular tasks or implement particular abstract data types.

FIG. 5 is a block diagram illustrating a computing system 500 implementing a longevity bond management system components 580 in accordance with an embodiment of the invention. This configuration is merely exemplary and should not be construed as limiting. It is likely that multiple computing systems or devices will be utilized to implement the method and system in accordance with embodiments of the invention. The computing system 500 may include a processing unit 510, a peripheral interface 520, a user input interface 530, a system bus 540, a system memory 550, a network interface 5900, a connected modem 592, and a memory interface 594. The system bus 540 may be provided for coupling the various system components. In embodiments of the invention, certain components, such as modem 592, need not be included.

Computers typically include a variety of computer readable media that can form part of the system memory and be read by the processing unit. By way of example, and not limitation, computer readable media may comprise computer storage media and communication media. The system memory 550 may include computer storage media in the form of volatile and/or nonvolatile memory such as read only memory (ROM) 560 and random access memory (RAM) 570.

A basic input/output system (BIOS) 562, containing the basic routines that help to transfer information between elements, such as during start-up, is typically stored in ROM 560. RAM 570 typically contains data and/or program modules that are immediately accessible to and/or presently being operated on by processing unit. The data or program modules may include an operating system 574, country identification system 200, other program modules 576, and program data 582. The operating system may be or include a variety of operating systems such as Microsoft Windows® operating system, the Unix operating system, the Linux operating system, the Xenix operating system, the IBM AIX™ operating system, the Hewlett Packard UX™ operating system, the Novell Netware™ operating system, the Sun Microsystems Solaris™ operating system, the OS/2™ operating system, the BeOS™ operating system, the Macintosh™® operating system, the Apache™ operating system, an OpenStep™ operating system or another operating system of platform.

At a minimum, the memory 550 includes at least one set of instructions that is either permanently or temporarily stored. The processor 510 executes the instructions that are stored in order to process data. The set of instructions may include various instructions that perform a particular task or tasks, such as those shown in the appended flowcharts. Such a set of instructions for performing a particular task may be characterized as a program, software program, software, engine, module, component, mechanism, or tool. The longevity bond management system 580 may include a plurality of software processing modules stored in a memory as described above and executed on a processor in the manner described herein. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer. Any suitable programming language may be used in accordance with the various embodiments of the invention. Illustratively, the programming language used may include assembly language, Ada, APL, Basic, C, C++, COBOL, dBase, Forth, FORTRAN, Java, Modula-2, Pascal, Prolog, REXX, and/or JavaScript for example. In embodiments of the invention, Ab Initio™ software is implemented and structured query language (SQL) is implemented for coding.

Further, it is not necessary that a single type of instruction or programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module.

The computing environment may also include other removable/nonremovable, volatile/nonvolatile computer storage media. For example, a hard disk drive may read or write to nonremovable, nonvolatile magnetic media. A magnetic disk drive may read from or writes to a removable, nonvolatile magnetic disk, and an optical disk drive may read from or write to a removable, nonvolatile optical disk such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

The processing unit 510 that executes commands and instructions may be a general purpose computer, but may utilize any of a wide variety of other technologies including a special purpose computer, a microcomputer, mini-computer, mainframe computer, programmed micro-processor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID processor, smart chip, or any other device or arrangement of devices that is capable of implementing the steps of the processes of the invention.

It should be appreciated that the processors and/or memories of the computer system need not be physically in the same location. Each of the processors and each of the memories used by the computer system may be in geographically distinct locations and be connected so as to communicate with each other in any suitable manner. Additionally, it is appreciated that each of the processor and/or memory may be composed of different physical pieces of equipment.

A user may enter commands and information into the computer through a user interface 530 that includes input devices such as a keyboard and pointing device, commonly referred to as a mouse, trackball or touch pad. Other input devices may include a microphone, joystick, game pad, satellite dish, scanner, voice recognition device, keyboard, touch screen, toggle switch, pushbutton, or the like. These and other input devices are often connected to the processing unit through a user input interface that is coupled to the system bus, but may be connected by other interface and bus structures, such as a parallel port, game port or a universal serial bus (USB).

One or more monitors or display devices may also be connected to the system bus via an interface 520. In addition to display devices, computers may also include other peripheral output devices, which may be connected through an output peripheral interface. The computers implementing the invention may operate in a networked environment using logical connections to one or more remote computers, the remote computers typically including many or all of the elements described above.

Various networks may be implemented in accordance with embodiments of the invention. These networks may include any of those described above with reference to FIG. 4. Although many other internal components of the computer are not shown, those of ordinary skill in the art will appreciate that such components and the interconnections are well known. Accordingly, additional details concerning the internal construction of the computer need not be disclosed in connection with the present invention.

Those skilled in the art will appreciate that the invention may be practiced with various computer system configurations, including hand-held wireless devices such as mobile phones or PDAs, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

Although the aforementioned components are shown as discrete modules, each of the modules may alternatively be integrated with one another. If the modules are discrete, multiple modules may operate cooperatively as will be further explained below.

Although many other internal components of the computer are not shown, those of ordinary skill in the art will appreciate that such components and the interconnections are well known. Accordingly, additional details concerning the internal construction of the computer need not be disclosed in connection with the present invention.

Figure 6:
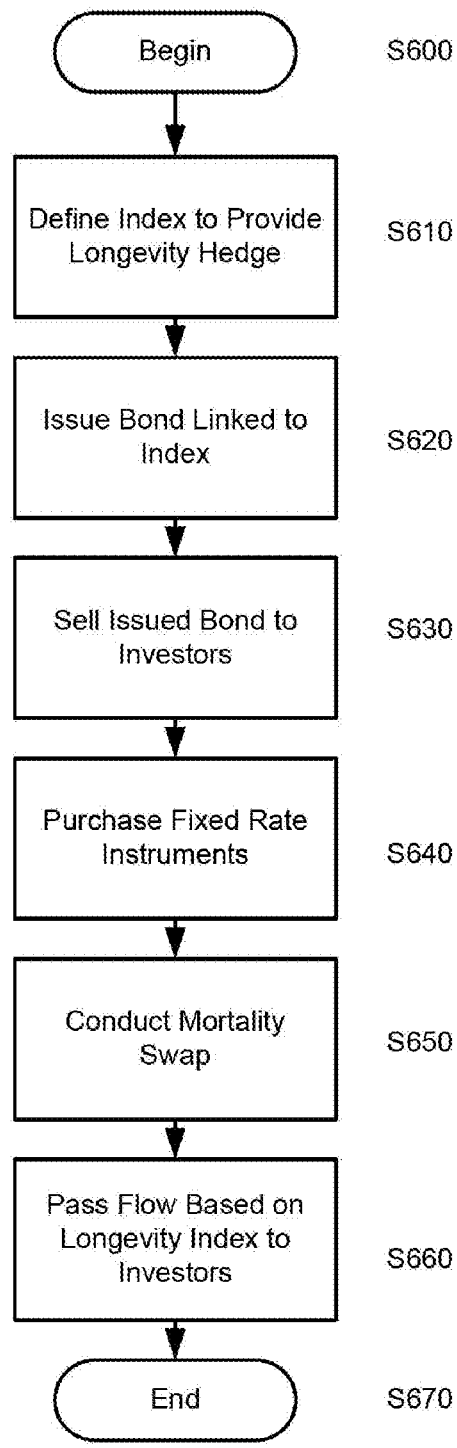
FIG. 6 is a flow chart illustrating a method in accordance with an embodiment of the invention.

FIG. 6 is a flow chart illustrating a method in accordance with an embodiment of the invention. The method begins in S600 and the system defines an index to provide a longevity hedge in S610. In S620, the system issues a bond linked to the defined index. In S630, the system sells the bond to investors and in S640 the system purchases fixed rate instruments. In S650, the system conducts a mortality swap and in S660, the system passes flow based on the longevity index back to the investors. The method ends in S670. Although shown in a specific order, the order of these method steps may be altered without departing from the scope and spirit of the invention. In embodiments of the method, these steps are performed by or with the assistance of one or more processors executing software modules as described above. Furthermore, each of the steps described above may include additional sub-steps, which will be described in greater detail below.

In S610, the bond is structured by defining an index. In embodiments of the invention, the index is related to a sub-group of an annuitant population. The sub-group may include surviving female spouses who become annuitants upon the death of their husbands. Thus, the longevity index is an index of surviving female spouses that determines bond cash flows. Cash flows increase if the female spouses live longer than expected and decrease if they die earlier than expected. The longevity index is an index of those surviving female spouses in a particular cohort who are alive and receiving an annuity (pension) at any time over the life of the bond Thus, at any given time during the life of the bond, the annuitants may include: (1) initial annuitants or surviving spouses who are widows and receiving an annuity at start of the index; and (2) later annuitants, which includes surviving spouses who were not initial annuitants, but whose husband has subsequently died and are now annuitants In embodiments of the invention, the cohort refers to the closed group of female spouses who are initially aged sixty to eighty five years old at the inception date of the longevity bond. A lifetime of the hedge, such as twenty five years, may also be defined. Although these figures relate to an embodiment of the invention, the selection of a cohort may include various age spans, such as, for example, five years to forty years.

Furthermore a maximum age, such as ninety years, may be established for members of the cohort. Exposure to those over a given age cannot be reliably priced due to the limited amount of mortality information currently available for those ages. Hence the system may stop hedging payments to surviving female spouses should they live beyond a pre-defined age, because the cohort should be selected so that ample data is available. A maximum age for the cohort may be raised for future embodiments if more data becomes publicly available. Additionally, the index is weighted by the amount of each surviving spouse's annuity payment.

Thus, the underlying exposure is the stream of annuity cash flows (pension payments) paid to widows periodically, for example yearly. The longevity risk that is hedged is the risk associated with the length of time over which pension payments are made to the surviving female spouses. This longevity risk is thus contingent on two mortality rates including the male mortality rate of the male annuitant and the female mortality rate of the female beneficiary. The annuity payments to the female beneficiary begin upon the death of the associated male annuitant and the annuity payments to the female beneficiary stop upon the female beneficiary's death.

An objective is to provide regulatory capital relief and economic capital relief as a benefit for longevity risk management. In the embodiment described above, the bond hedges the cash flow risk related to female spouses. The insurer receives payments each year related to the level of the longevity index of surviving female spouses.

The longevity hedge removes the uncertainty in the time over which pension payments are made to the female beneficiary, by exchanging the uncertain set of payments for a certain fixed set of payments. The hedge is based on the longevity index, which reflects the longevity of the total reported population of female beneficiaries or the reference population. The bond cash flows include payments to the insurer linked to the longevity index described above. The longevity component of bond cash flow can be characterized as $$\text{Longevity component in year } t = \text{Notional} \times S_t + \text{Time Adjustment} \quad (1)$$

Where t=0 corresponds to the start of the hedge and the inception of the longevity index. S, the longevity index, corresponds to the pensions paid to the reference population of female beneficiaries, which closely tracks the actual payments of an insurer to its own target population of female beneficiaries, which is a subset of the reference population. As a result the longevity hedge provides effective reduction in the longevity risk associated with the target population of female beneficiaries.

Thus, in summary, the longevity index $S_t$ is a survivorship index related to a reference population of female beneficiaries for which data has been collected. The index cohort may be further defined at the inception of the index to be within a specific age range, such as for example, sixty to eighty five years, at the inception of the hedge. Furthermore, the cohort may be further limited to have a maximum age, such as for example, ninety years. A purpose of the index is to track the pension payments made by live insurers to female spouses, once their husbands have died.

Thus, based on the definition of the index, if female beneficiary mortality rates are lower than expected, the index will be higher than expected as more female beneficiaries will survive. If male mortality rates are lower than expected, then the index will be lower than expected, as there will be more husbands still alive and therefore fewer female spouses receiving an annuity.

The longevity index reflects the full population or reference population for which data is collected and therefore reflects the combined population of beneficiaries of all insurers at that time. In contrast, the target population of beneficiaries of a single insurer will be a subset of the reference population of beneficiaries in the index. While both populations should track each other closely, there will be small differences in the mortality experience of each. Residual basis risk will exist due to the differing identities of the target population and the reference population and for portfolios with small number of lives, sampling risk will be present and regardless of the portfolio size.

In embodiments of the invention, the longevity index definition formula for time t years after hedge starts is as follows:

$$S_t^{observed} = \sum_{y=60}^{91-\max(t,6)} b_y \cdot I_{t,y}^{observed} \quad (2)$$

Where $I_{t,y}^{observed}$ served is the cohort specific survivorship index, given by $$I_{t,y}^{observed} = {}_t p_y^{f,observed} \cdot [1-(1-w_y^{initial}) \cdot {}_t p_{y+k(y)}^{m,observed}] \quad (3)$$

and the symbols in the equations are defined as follows:

(a) y labels the cohort and can be thought of as the age at the start of the index, i.e. at time 0, 1 Jan. 2009; (b) $b_y$ is the initial (i.e., time zero) weight of all female beneficiaries in cohort y as a proportion of all female beneficiaries aged sixty to eighty five, calculated by annual annuity amount; (c) $_tp_y^{f,observed}$ is the observed survival rate from time 0 until time t for the age y cohort of female beneficiaries; (d) $w_y^{initial}$ is the initial (i.e., time zero) weight of widows among all female beneficiaries in cohort y calculated by annual annuity amount; (e) k(y) is the average age difference in years between husbands and female beneficiaries in cohort y, weighted by income amount; (f) $_tp_{y+k(y)}^{m,observed}$ is the observed survival rate from time 0 to time t for the y+k(y) cohort of males.

In order to calculate mortality rates, "Insurance Age" (IA) needs to first be calculated:

$$IA = \text{exact date of opening of the policy} - \text{exact date of birth} \qquad (4)$$

Using this precise (i.e. non-rounded) figure, the date of birth is recalculated (and called "VYB") as follows:

$$VYB = \text{year in which policy was opened} - IA \qquad (5)$$

The following ages may then be calculated, given a specific "observation period" for calculation of exposures as illustrated in Table 1 below.

TABLE 1

| | | |
|---|---|---|
| yi | age at which the observation starts | year at which the observation starts - VYB |
| zi | age at which the observation period ends | year at which the observation ends - VYB |
| θi | exact age of death | IA + exact death - exact opening of the policy |
| φi | renunciation age | renunciation year - VYB |

Based on this information, the exposure at age x, Ex, can be calculated.

(5) Ex=sum of all the individuals satisfying:
  (i) yi<x+1
  (ii) zi≧x+1
  (iii) θi=0 or x≦θi
  (iv) φi=0 or x≦φi.

Additionally, the deaths at age x, $\Theta_x$, can be calculated.

$\Theta x$=sum of exposed individuals at age $x$ satisfying:
  $x < \theta i \leq x+1$ (6)

Furthermore, the mortality rate $q_x$ can be defined as $$q_x = E_x / \Theta_x \qquad (7)$$

The following Table 2 shows an example of how pension payments for a single age sample population of female beneficiaries might develop over time: For the cohort of female beneficiaries aged 60 on 1 Jan. 2009, at start date (time 0) for the index of 1 Jan. 2009 (t=0 is 1 Jan. 2009, t=1 is 1 Jan. 2010, t=2 is 1 Jan. 2011, etc. . . . ), with the following weights and mortality rates.

TABLE 2

| Weights | Mortality Rates | | Survival Rates | |
|---|---|---|---|---|
| | female | male | female | male |
| k(60) = 5 | $q_{60,2009}^f = 2\%$ | $q_{65,2009}^m = 5\%$ | $_0p_{60}^f = 100\%$ | $_0p_{65}^m = 100\%$ |
| $w_{60}^{initial} = 50\%$ | $q_{61,2010}^f = 3\%$ | $q_{66,2010}^m = 6\%$ | $_1p_{60}^f = 100\% \times 98\% =$ | $_1p_{65}^m = 100\% \times 95\% =$ |
| | $q_{62,2011}^f = 4\%$ | $q_{67,2011}^m = 7\%$ | $_2p_{60}^f = 98\% \times 97\% = 95\%$ | $_2p_{65}^m = 95\% \times 94\% = 89\%$ |
| | | | $_3p_{60}^f = 95\% \times 96\% = 91\%$ | $_3p_{65}^m = 89\% \times 93\% = 83\%$ |

TABLE 3

| Date | Payment |
|---|---|
| Jan. 1, 2009 | $2000 \times I_{t,y}^{observed} = 2000 \cdot {_tp_y^{f,observed}} \cdot [1 - (1 - w_y^{initial}) \cdot {_tp_{y+k(y)}^{m,observed}}]$ |
| Jan. 1, 2010 | $2000 \times I_{0,60}^{observed} = 2000 \cdot 100\% \cdot [1 - (1 - 50\%) \cdot 100\%] = 1000$ |
| Jan. 1, 2011 | $2000 \times I_{1,60}^{observed} = 2000 \cdot 98\% \cdot [1 - (1 - 50\%) \cdot 95\%] = 1029$ |
| Jan. 1, 2012 | $2000 \times I_{2,60}^{observed} = 2000 \cdot 95\% \cdot [1 - (1 - 50\%) \cdot 89\%] = 1052.31$ |
| | $2000 \times I_{3,60}^{observed} = 2000 \cdot 91\% \cdot [1 - (1 - 50\%) \cdot 83\%] = 1067.27$ |

If the yearly annuity corresponding to all female beneficiaries is 2000, the index payments corresponding to the cohort are as illustrated in TABLE 3.

Figure 7:
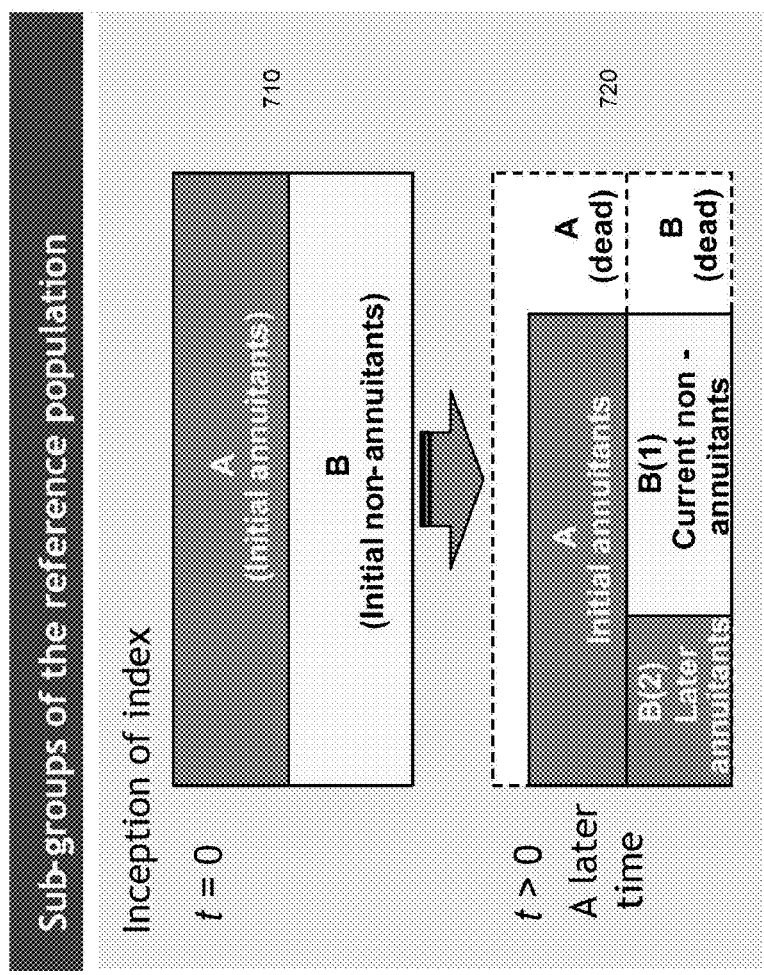
FIG. 7 is a diagram illustrating subgroups of a reference population over time in accordance with an embodiment of the invention.

FIG. 7 is provided to further illustrate subgroups of a selected reference population at two separate points in time 710 and 720. At t=0 or 710, the reference population is divided into an A group of initial annuitants and B group of initial non-annuitants. Over time some number of initial annuitants in the A group and initial non-annuitants in the B group will die. Furthermore, some of the initial non-annuitants in the B group will become annuitants B(2). These divisions within the A group and the B group are illustrated at 720 at later time t>0.

Figure 8:
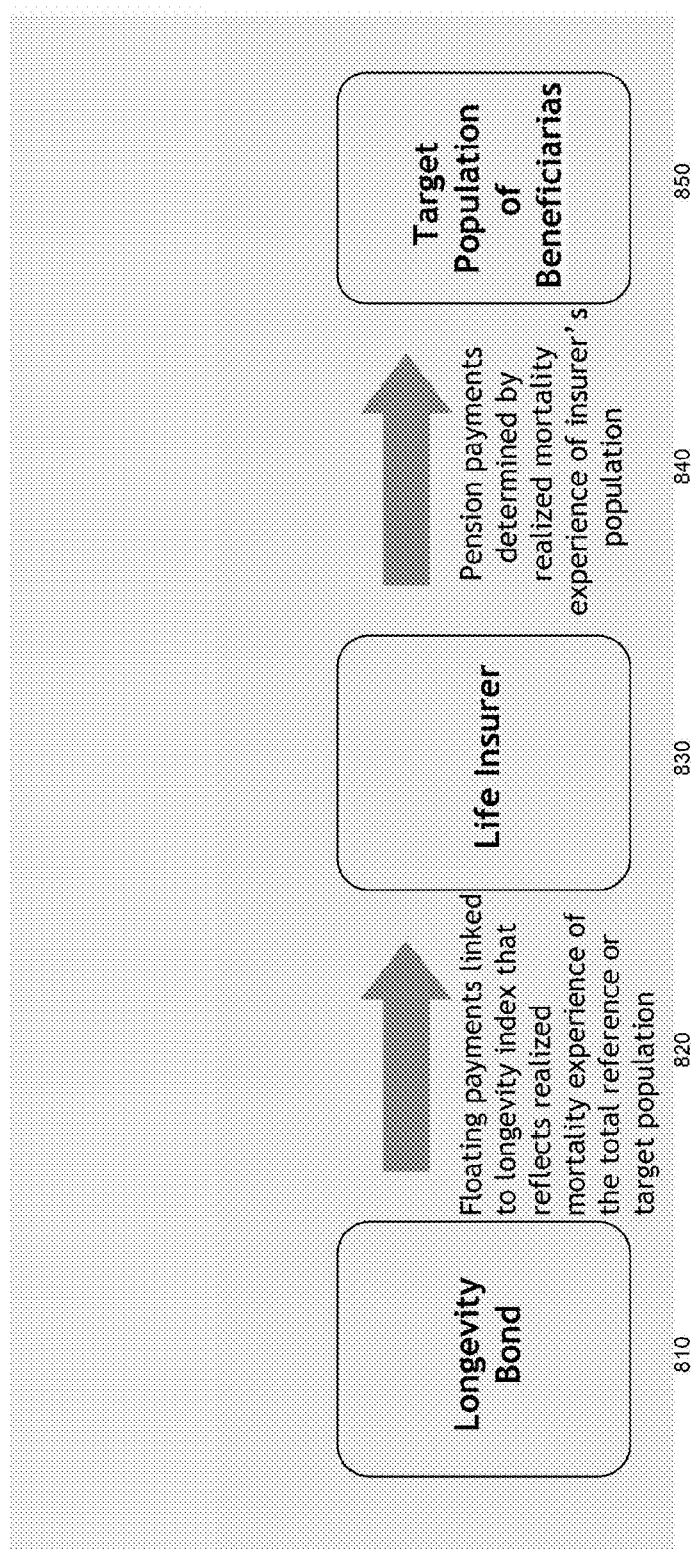
FIG. 8 is a block diagram illustrating operation of a hedging instrument in accordance with an embodiment of the invention.

FIG. 8 broadly illustrates the process of longevity hedging. A longevity bond 810 is issued. An investor, shown as life insurer 830 receives floating payments 820 linked to the longevity index that reflect the realized mortality experience of the total target population. Ultimately, members of the target population 850, who are female beneficiaries in accordance with an embodiment of the invention, receive pension payments determined by the realized mortality experience of the insurer's population.

Figure 9:
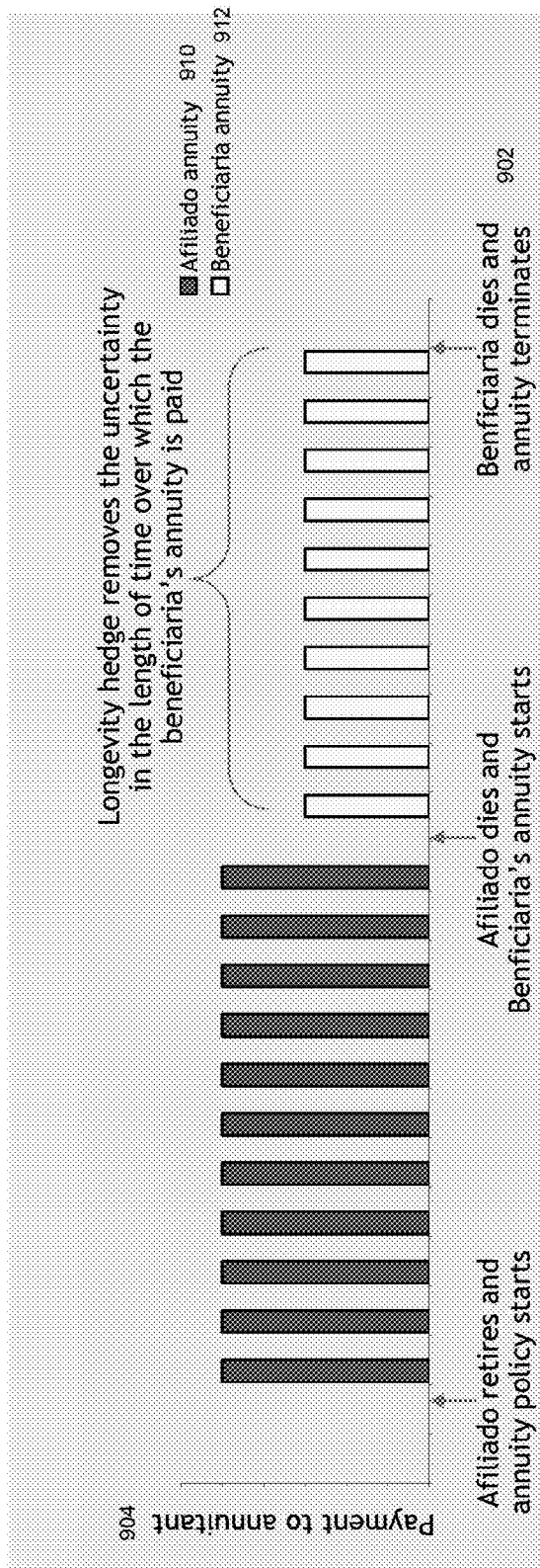
FIG. 9 is a chart illustrating hedging of longevity in accordance with an embodiment of the invention.

FIG. 9 is a chart illustrating the evolution of annuity payments for participants in a policy over time. An x-axis 902 represents time and y-axis 904 represents payments. Shaded bars 910 represent a male annuity and white bars 910 represent a female beneficiary annuity 912. As illustrated, at a first point in time, the male annuitant retires and he begins receiving annuity payments. At a second point in time, the male annuitant dies and annuities to his female beneficiary begin. Finally, at a third point in time, the female beneficiary dies and the annuity terminates.

FIG. 10A is a graph illustrating survivorship of initial annuitants and graph 10B illustrates survivorship of later annuitants. Time is shown on x-axes 1002 and 1022 and survivorship is shown on y-axes 1004, 1024. As illustrated, survivorship of initial annuitants decreases over time. Survivorship of later annuitants increases to a peak and subsequently decreases over time.

Figure 11:
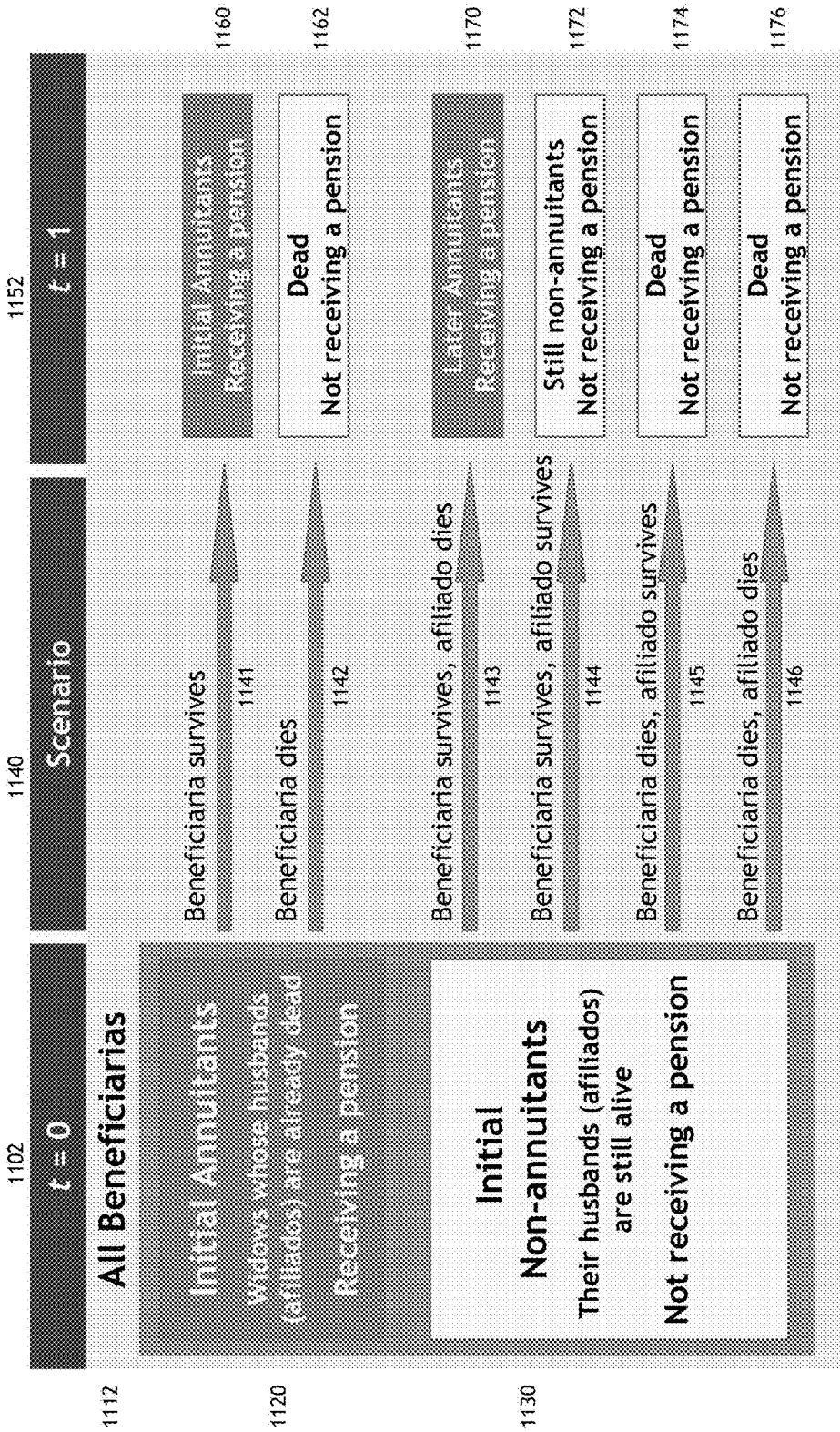
FIG. 11 is a diagram illustrating evolution of a reference population in accordance with an embodiment of the invention.

FIG. 11 further illustrates the reference population. Columns of FIG. 11 are divided to show an initial time 1102, scenario 1140, and a later time 1152. At 1102 (t=0), all female beneficiaries 1112 are divided into groups of initial annuitants 1120 who are already receiving a pension and initial non-annuitants 1130 whose husbands are still alive and who are not receiving a pension.

Initial annuitants 1120 who survive over time 1141 will continue receiving a pension and will be grouped as initial annuitants receiving a pension at 1160. If an initial annuitant receiving a pension dies 1142, this initial annuitant will be classified as dead and not receiving a pension at 1162.

From the pool of initial non-annuitants 1130, a number of scenarios are feasible. First, the female beneficiaries may survive and the male annuitant may die at 1143, making the female beneficiary a later annuitant receiving a pension at 1170. Alternatively, the female beneficiary and male annuitant may both survive at 1144, such that the female beneficiaries remain non-annuitants at 1172. As a further alternative, the female beneficiary may die and the male annuitants may survive at 1145, making the female beneficiary dead and not receiving a pension at 1174. As a final alternative, both the female beneficiary and male annuitant may die at 1146, making the female beneficiary dead and not receiving a pension at 1176.

FIG. 12 is a table 1200 illustrating weights for the longevity index. The longevity index requires weights to determine the proportion of different groups in the index. The longevity index reflects the total pension amount being paid to beneficiaries at any point in time. The index depends on observed mortality rates for both males and females over time and observed initial weights of (i) different age cohorts and (ii) widowed beneficiaries versus non-widowed beneficiaries. The index is weighted by the amount of each beneficiary's annuity payment. The relative weightings between different age groups and between annuitants and non-annuitants in the index are determined by the data set at inception.

In particular, weights are provided for different ages, initial annuitant vs. initial non-annuitant beneficiaries, and average age difference between male annuitants and female beneficiaries. As shown in FIG. 12, the initial values of these weights at inception of the index are set to be identical to those for the entire available data set. The target population being hedged needs to be designated carefully to reflect that portion of the total insurer population that has the same weights as the index weights.

The table 1200 includes columns showing age 1210, cohort weights by age 1220, initial annuitants % 1230, and age difference in years between male annuitant and female beneficiaries 1240.

Figure 13:
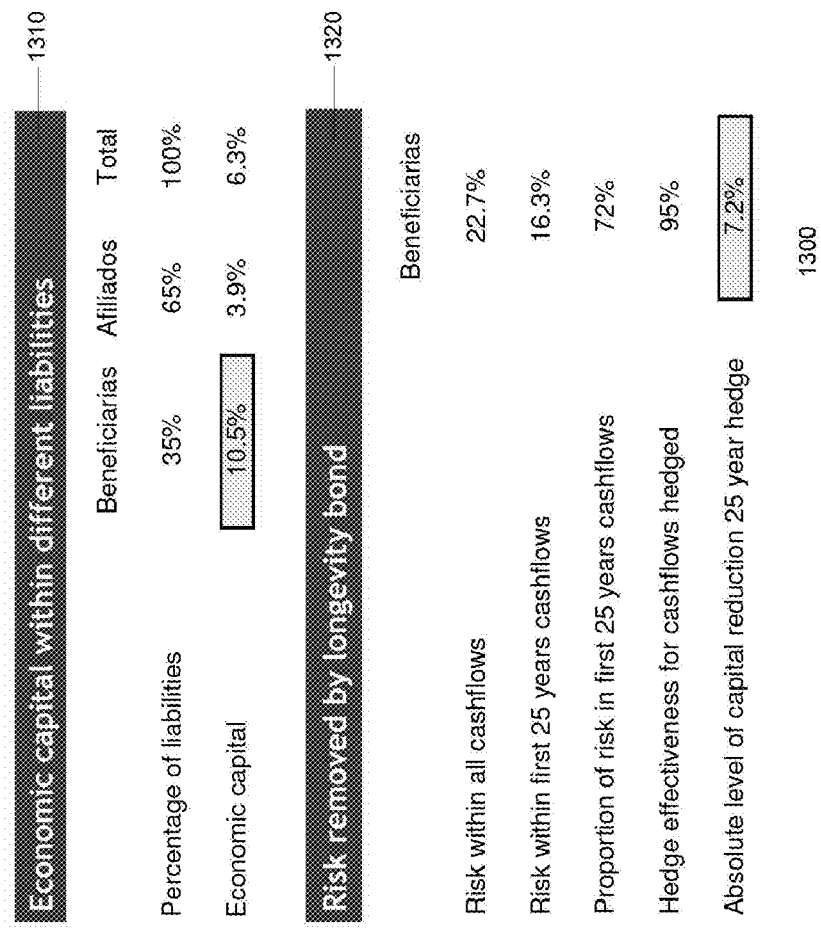
FIG. 13 is a chart illustrating economic capital relief in accordance with an embodiment of the invention.

FIG. 13 is a table 1300 illustrating risk reduction 1320 and economic capital relief 1310 in connection with the specific reference population described above. Any reduction in risk leads to a reduction in the amount of economic capital required to support the business. By reducing the amount of capital supporting the business, there is an immediate benefit in terms of saving the cost of providing that capital. As illustrated in FIG. 13, the economic risk within a typical portfolio of annuities is calculated to be 6.3% of the current value of the liabilities, the economic risk capital with both a portfolio of male annuitants and female beneficiaries are calculated to be 3.9% and 10.5% respectively of the value of their respective liabilities. The higher number for female beneficiaries reflects the fact that the duration of their annuity payments is much greater.

The model suggests that: about 72% of the longevity risk is contained in the first twenty five years cash flows, which are the years being hedged by the bond. The model further suggests that about 95% of the longevity risk in the first twenty five years cash flows are being hedged by the bond. This suggests that the reduction in economic risk capital is about 10.5%×72%×95%=7.2%. Overall, this suggests that the reduction in economic risk capital is about 10.5%×72%×95%=7.2% as a result of the proposed longevity hedge. Longevity risk within a portfolio of annuities is concentrated within the contingent pensions such as those to the female beneficiaries as payments to those policyholders have a significantly longer duration than the portfolio as a whole. Consequently, the economic risk capital for a portfolio of contingent beneficiaries pensions, as a percentage of the value their liabilities, is much higher than for a portfolio of male annuitant pensions.

Figure 14:
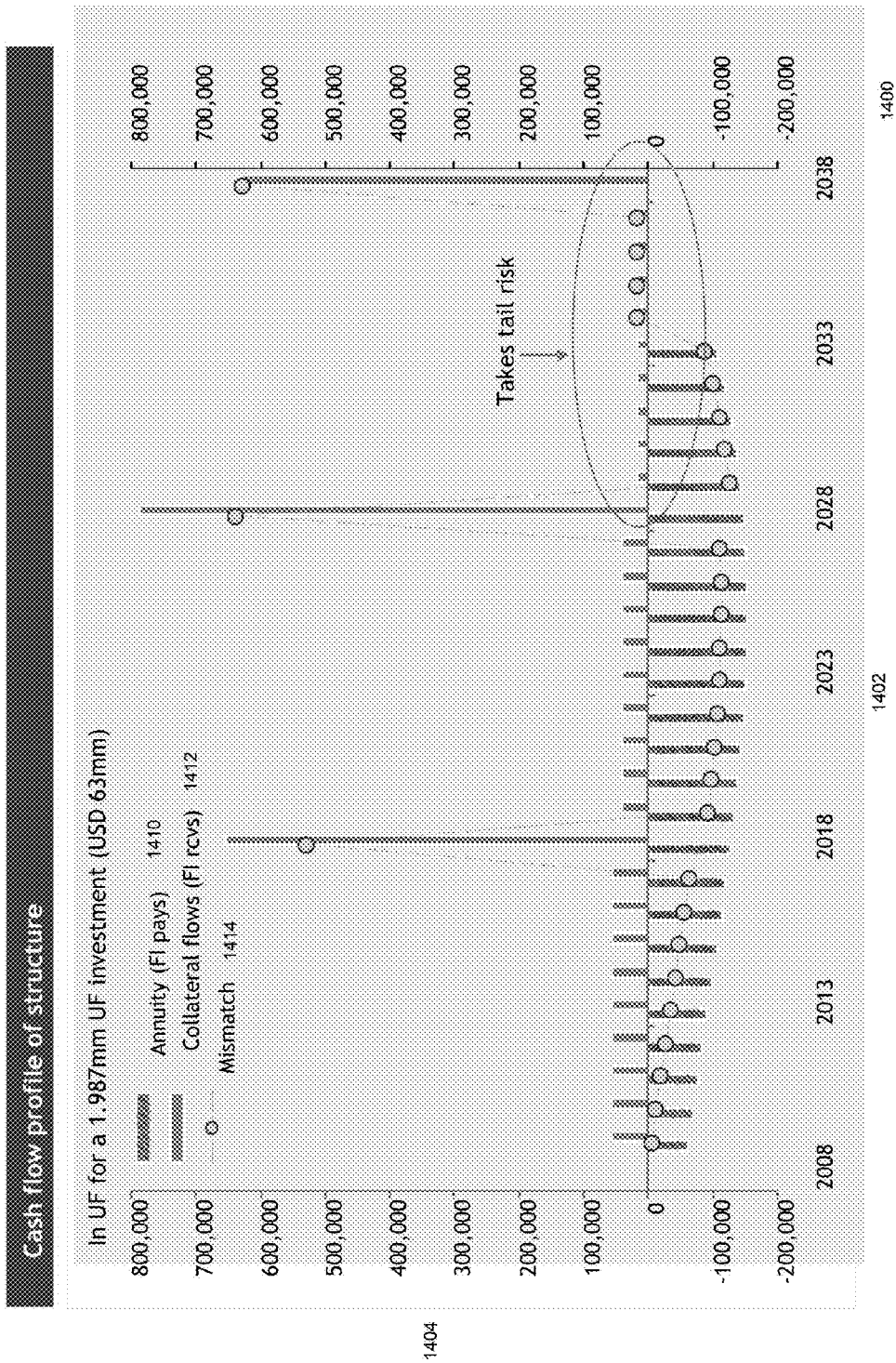
FIG. 14 is a chart illustrating a cash flow profile in accordance with an embodiment of the invention.

FIG. 14 is a chart 1400 illustrating management of a cash flow mismatch 1414 between collateral flows 1412 received by the financial institution and annuities 1410 paid by the financial institution. An x-axis 1402 represents time and a y-axis 1404 represents cash flow.

Overall, the use of a longevity bond for hedging provides a benefit to insurers in the form of reduction in regulatory capital, economic capital, and increased certainty of future cash flow. The cost of the hedge should be formulated at a price at which a third party will take longevity risk. In embodiments of the invention, reduced costs of the hedge may be created through increased size of bond issuance through reduction in fixed costs.

Thus, the longevity bond is structured by the longevity bond management system as a bond with an amortizing profile, such that the insurer, as the hedging party, makes an up-front payment and receives a series of annual payments over the course of the hedge duration. The payments are adjusted by the actual longevity performance of the beneficiary population relative to a projected longevity performance based on a longevity index. Thus, if the beneficiaries tend to live longer than anticipated, the cash flows to the hedging party increase. If the beneficiaries have a shorter life span than expected, cash flows are downwardly adjusted. Thus, the hedging party benefits from a substantial removal of longevity risk at a modest cost. Furthermore, the removal of the risk may reduce capital reserve requirements imposed by regulatory authorities so that capital is freed for other uses.

The longevity bond and management system provide at least three features to address insurers' requirements. First, the longevity bonds provide a longevity hedge in order to offset exposure to risk. In this instance, the longevity bond provides a hedge of longevity risk associated with the insurer's annuity portfolio. In specific embodiments of the invention, the longevity bond specifically hedges the longevity risk associated with the sub-group of the annuitant population corresponding to specific beneficiaries. The longevity bond is tied to a longevity index of these beneficiaries that determines bond cash flows. Cash flows increase if the beneficiaries have a longer life span than expected and decrease if the beneficiaries lives span a shorter duration than expected.

Secondly, the longevity bonds provide an attractive investment to insurers. The bond proceeds may be invested in a portfolio of low risk debt type products. This product may be, for example, a government bond or a high-grade corporate bond. In embodiments of the invention, the bond proceeds are invested in a portfolio of government BTUs (Chilean government bonds). This allows for cash flows that match longevity risk of the liability, with the security of Chilean government risk. Similar embodiments may be implemented across varying governments and currencies. The structure provided for implementing the longevity bonds allows for a higher yield than BTUs and thus offsets cost of longevity hedge. In yet additional embodiments, bond proceeds may be invested in bonds of higher strength with some element of credit risk in order to reduce the cost of the longevity hedge.

Finally, the proposed longevity bond management system and method provides economic capital relief to insurers as a benefit for longevity risk management. The longevity bond hedges the cash flow risk related to beneficiaries. The insurer receives payments each year equal to the level of a longevity index of the beneficiaries.

While particular embodiments of the invention have been illustrated and described in detail herein, it should be understood that various changes and modifications might be made to the invention without departing from the scope and intent of the invention.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations.

What is claimed is:

1. A computer implemented method for implementing a longevity bond management system, the method comprising:
    issuing, through a special purpose vehicle, by one or more computers, a longevity bond having returns following a longevity index defined for a reference population of a pre-selected cohort of beneficiaries, wherein the longevity index has a best estimate value at inception of the index for each year during a lifespan of the longevity bond;
    receiving from investors a payment amount for investment in the longevity bond;
    investing the payment amount in a collateral pool held by a custodian;
    receiving cash flows from the investment in the collateral pool;
    entering into a swap to exchange the cash flows from the investment for an amount calculated based on a difference between an actual value of the longevity index for a given year of the longevity bond based on mortality of members of the pre-selected cohort and the best-estimate value of the longevity index amount for the given year of the longevity bond;
    calculating, by said one or more computers, based on both the best estimate value of the longevity index for the given year of the longevity bond and the actual value of the longevity index for the given year of the longevity bond, a periodic payment to the investors, wherein calculating includes increasing the periodic payment when longevity of the pre-selected cohort exceeds expectations and decreasing the periodic payment when longevity of the pre-selected cohort falls short of expectations; and
    forwarding the calculated periodic payment to the investors.

2. The method of claim 1, further comprising defining the pre-selected cohort as including female beneficiaries of male annuitants, wherein the female beneficiaries are within a twenty to thirty year age span at inception of the index and further defining the cohort as restricted to beneficiaries under a maximum age.

3. The method of claim 2, wherein the cohort includes female beneficiaries between ages sixty and eighty five at inception of the index.

4. The method of claim 3, wherein female beneficiaries drop out of the cohort upon reaching an age of ninety.

5. The method of claim 1, further comprising defining the longevity index for the cohort for time t years after inception as follows:

$$S_t^{observed} = \sum_{y=60}^{91-max(t,6)} b_y \cdot I_{t,y}^{observed}$$

where $I_{t,y}^{observed}$ is the cohort specific survivorship index, given by $$I_{t,y}^{observed} = {}_tp_y^{f,observed} \cdot [1-(1-w_y^{initial}) \cdot {}_tp_{y+k(y)}^{m,observed}]$$

where y labels the cohort and represents age at the start of the index, $b_y$ is an initial weight of all female beneficiaries in the cohort as a proportion of all female beneficiaries aged sixty to eighty five, calculated by annual annuity amount; ${}_tp_y^{f,observed}$ is an observed survival rate from time 0 until time t for the age y cohort of female beneficiaries; $w_y^{initial}$ is an initial weight of widows among all female beneficiaries in cohort y calculated by annual annuity amount, k(y) is the average age difference in years between male annuitants and female beneficiaries in cohort y, weighted by income amount; ${}_tp_{y+k(y)}^{m,observed}$ is the observed survival rate from time 0 to time t for the y+k(y) cohort of male annuitants.

6. The method of claim 1, wherein investing the payment amount in a collateral pool held by a custodian further comprises investing in a low risk debt product.

7. The method of claim 1, wherein investing the payment amount in a collateral pool held by a custodian further comprises investing in government issued bonds.

8. The method of claim 1, wherein executing a swap comprises exchanging cash flows between the special purpose vehicle and a financial institution and allowing the financial institution to transact with a super-national entity such that the super-national entity directly transact with the special purpose vehicle to enable the special purpose vehicle to receive a difference between an actual and best-estimate longevity index.

9. The method of claim 8, wherein the super-national entity provides credit enhancement to a re-insurer and the reinsurer underwrites longevity risk.

10. The method of claim 1, wherein calculating the periodic payment to investors for a payout date comprises adding an initial annuity amount to a product of the initial annuity amount and an initial longevity index forecast and multiplying the sum by a difference between an actual value of the longevity index on the payout date and an initial forecast of the longevity index for the payout date.

11. A computer system for longevity bond issuance and management, the computer system comprising:
    at least one computer memory for storing instructions; and
    at least one computer processor for accessing the stored data and instructions and executing the instructions to perform steps including;
    issuing, through a special purpose vehicle, a longevity bond having returns following a longevity index defined for a reference population of a pre-selected cohort of beneficiaries, wherein the longevity index has a best estimate value at inception of the index for each year during a lifespan of the longevity bond;

receiving from investors a payment amount for investment in the longevity bond;

investing the payment amount in a collateral pool held by a custodian;

receiving cash flows from the investment in the collateral pool;

entering into a swap to exchange the cash flows from the investment for an amount calculated based on a difference between an actual value of the longevity index for a given year of the longevity bond based on mortality of members of the pre-selected cohort and the best-estimate value of the longevity index amount for the given year of the longevity bond;

calculating, based on both the best estimate value of the longevity index for the given year of the longevity bond and the actual value of the longevity index for the given year of the longevity bond, a periodic payment to the investors, wherein calculating includes increasing the periodic payment when longevity of the pre-selected cohort exceeds expectations and decreasing the periodic payment when longevity of the pre-selected cohort falls short of expectations; and forwarding the calculated periodic payment to the investors.

12. The system of claim 11, wherein the pre-selected cohort comprises female beneficiaries of male annuitants, wherein the female beneficiaries are within a twenty to thirty year age span at inception of the index and further defining the cohort as restricted to beneficiaries under a maximum age.

13. The system of claim 11, wherein the cohort includes female beneficiaries between ages sixty and eighty five at inception of the index.

14. The system of claim 13, wherein female beneficiaries drop out of the cohort upon reaching an age of ninety.

15. The system of claim 11, further comprising defining the longevity index for the cohort for time t years after inception as follows:

$$S_t^{observed} = \sum_{y=60}^{91-max(t,6)} b_y \cdot I_{t,y}^{observed}$$

where $I_{t,y}^{observed}$ is the cohort specific survivorship index, given by $$I_{t,y}^{observed} = {}_tp_y^{f,observed} \cdot [1-(1-w_y^{initial}) \cdot {}_tp_{y+k(y)}^{m,observed}]$$

where y labels the cohort and represents age at the start of the index, $b_y$ is an initial weight of all female beneficiaries in the cohort as a proportion of all female beneficiaries aged sixty to eighty five, calculated by annual annuity amount; ${}_tp_y^{f,observed}$ is an observed survival rate from time 0 until time t for the age y cohort of female beneficiaries; $w_y^{initial}$ is an initial weight of widows among all female beneficiaries in cohort y calculated by annual annuity amount, k(y) is the average age difference in years between male annuitants and female beneficiaries in cohort y, weighted by income amount; ${}_tp_{y+k(y)}^{m,observed}$ is the observed survival from time 0 to time t for the y+k(y) cohort of male annuitants.

16. The system of claim 11, wherein investing the payment amount in a collateral pool held by a custodian further comprises investing in a low risk debt product.

17. The system of claim 11, wherein investing the payment amount in a collateral pool held by a custodian further comprising investing in government issued bonds.

18. The system of claim 11, wherein executing a swap comprises exchanging cash flows between the special purpose vehicle and a financial institution and allowing the financial institution to transact with a super-national entity such that the super-national entity directly transact with the special purpose vehicle to enable the special purpose vehicle to receive a difference between an actual and best-estimate longevity index.

19. The system of claim 18, wherein the super-national entity provides credit enhancement to a re-insurer and the reinsurer underwrites longevity risk.

20. The system of claim 11, wherein calculating the periodic payment to investors for a payout date comprises adding an initial annuity amount to a product of the initial annuity amount and an initial longevity index forecast and multiplying the sum by a difference between an actual value of the longevity index on the payout date and an initial forecast of the longevity index for the payout date.

* * * * *